P. DIETZ.
AUTOMATIC PROJECTION APPARATUS FOR LANTERN SLIDES.
APPLICATION FILED MAR 21, 1917.
1,371,871. Patented Mar. 15, 1921.
2 SHEETS—SHEET 1.
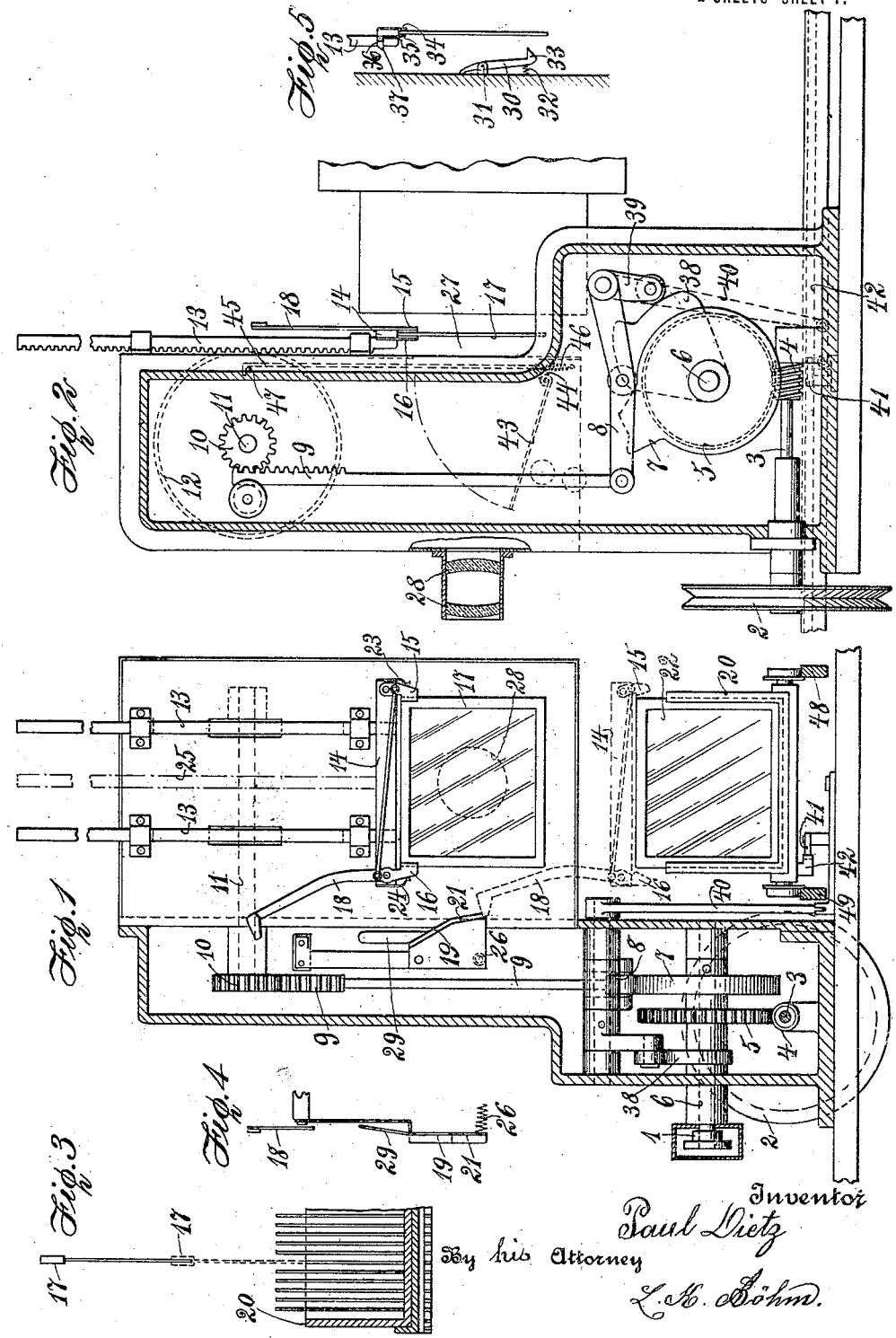
Inventor
Paul Dietz
By his Attorney
L. K. Böhm.

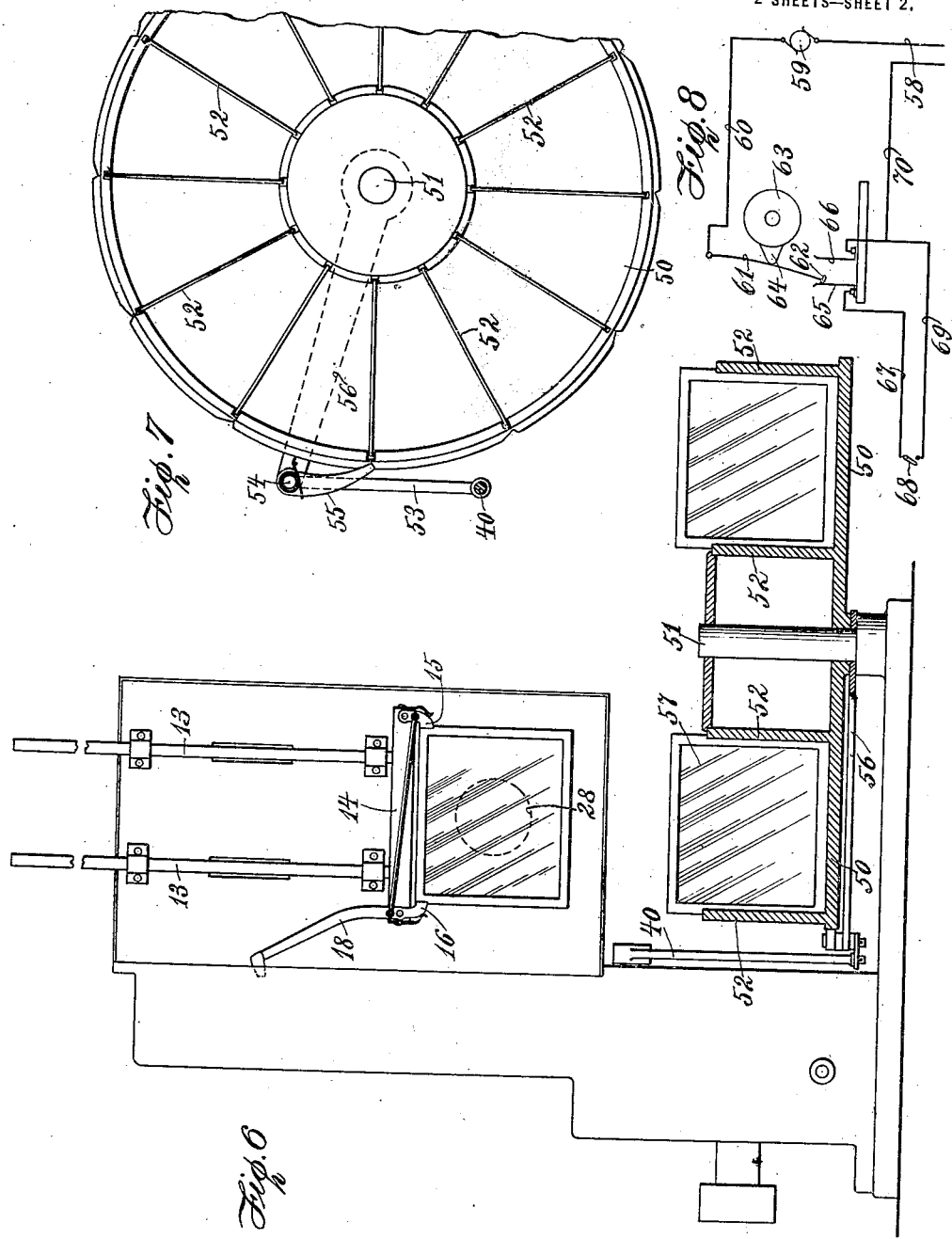

UNITED STATES PATENT OFFICE.

PAUL DIETZ, OF PHILADELPHIA, PENNSYLVANIA.

AUTOMATIC PROJECTION APPARATUS FOR LANTERN-SLIDES.

1,371,871.   Specification of Letters Patent.   Patented Mar. 15, 1921.

Application filed March 21, 1917. Serial No. 156,266.

*To all whom it may concern:*

Be it known that I, PAUL DIETZ, a citizen of the Empire of Germany, and a resident of Philadelphia, county of Philadelphia, State of Pennsylvania, have invented certain new and useful Improvements in Automatic Projection Apparatus for Lantern-Slides, of which the following is a specification.

This invention has reference to automatic projection apparatus for lantern slides. The projection apparatus is purposed for advertisements and home and lecture use, to exhibit slides for a short or longer period of time as desired.

The projection apparatus for advertising purposes is driven by a small motor which rotates continuously, as usual in an apparatus of this kind and each slide is exhibited for a uniform period of time. For home use the projection apparatus may be operated by manual or motive power. When manually actuated the apparatus certainly cannot be operated from a distance. However if a small motor is employed for driving the apparatus for home use and for lectures then the apparatus may be operated from any distance.

It is the special purpose of the present invention to produce an automatic projection apparatus for lantern slides which raises automatically one slide into the field of vision and returns this slide again automatically into its original position. The slides are kept in a receptacle in due order and as each slide is moved automatically the slides need not be handled and always retain their original order of arrangement. Any touching of a slide is entirely out of question and therefore the slides remain free from spots and do not require any protection glasses. If a motor is used as the driving power, for home or lecture use, then one operator less is required.

The motor is actuated by simply touching an electric button or operating a hand contact or switch, whereby the operative mechanism is actuated and the slides are automatically changed. The exhibited slide is automatically returned to the initial position in the receptacle, then the receptacle is moved one step and the next slide automatically moved into the field. This is effected by moving each plate automatically upward in a vertical plane and after having been exhibited the plate is returned to the original position downward in the same vertical plane. For the purpose of moving the slides gripper mechanism is provided which seizes and transports each slide. When a new slide is in the field the mechanism stops automatically until operated again by pressing the button or operating the contact or switch whereby the motor is started again and so forth. In order to avoid that the audience sees the shadows of a moving slide on the screen means are provided for automatically closing the shutter during the period of changing a slide. This device is applied to any kind of apparatus, for advertising purposes or for home and lecture use.

For advertising purposes the motor runs continuously and the apparatus is provided with a slide carrier of modified form. This carrier may consist of a rotatable disk device with radial slots of a number required for a set of slides needed for the desired advertisements. The disk slide carrier moves on a central shaft while in the carrier for home and lecture use, a box is the receptacle for the slides which moves step by step on rails.

The invention is illustrated in the accompanying drawings in which:

Figure 1 represents in elevation, an automatic projection apparatus for lantern slides with the casing in section.

Fig. 2 is a side view of the same with the casing also in section.

Fig. 3 illustrates the box mechanism for the slides for home and lecture purposes.

Fig. 4 is a detail view of a steering device for the slide moving mechanism.

Fig. 5 shows a modified form of the same.

Fig. 6 represents in elevation the projecting apparatus with a modified form of slide carrier to be used for advertising purposes.

Fig. 7 is a plan view of the modified form of slide carrier shown in Fig. 6.

Fig. 8 illustrates the electric diagram for home and lecture use.

Similar characters of reference denote like parts in all the figures.

As stated the projection apparatus may be driven by hand or by power. If driven by hand a small crank may be attached at the end 1 of the main shaft which is connected with the operative mechanism. When driven by a motor a sheave pulley 2 receives power from the motor rotating the pulley shaft 3. A worm 4 is mounted upon the pulley shaft 3 driving the worm gear 5 which is mounted upon the main shaft 6. This speed reducing worm mechanism may be replaced by any gear mechanism or other device adapted for the proper transmission of speed.

Upon the main shaft 6 a main cam 7 is mounted which lifts a lever 8 during its rotation. The lever 8 actuates a vertical tooth rack 9 which engages a pinion 10 mounted upon a shaft 11. Upon the same shaft a larger gear 12 is mounted which engages a long tooth rack 13 which moves up and down according to the direction of the movement of the gear 12. At the lower end of the tooth rack 13 the gripper mechanism is mounted which comprises a horizontal bar 14 at the ends of which the grippers proper or gripping fingers 15, 16 are movably connected. The gripping fingers hold a slide 17 when in the upper position shown in full lines and the slide then is in the field of vision. The gripping finger 16 is provided with a lever 18 bent at its upper portion. This lever forms part of the steering and opening and closing mechanism for the grippers. The lever 18 slides in a downward direction when the tooth rack 13 and the grippers 15, 16 move in a downward direction. During this movement the top nose of the lever 18 reaches and moves over the slanting surface 19 whereby it is deflected or forced inwardly and opens the gripping fingers 15, 16 thus releasing the slide 17, as shown in dotted lines in Fig. 1.

The slide 17 is released when at a certain location indicated in dotted lines in Fig. 3. From there the slide drops into the slide receptacle 20 by gravity. The slanting surface 19 of the steering device is more inclined than its continuation 21. When the slide 17 has been deposited in the receptacle 20 then the receptacle is moved one step by mechanism to be described hereinafter. This movement of the receptacle 20 for one step or space places the next slide 22 into a position to be gripped and raised by the gripping fingers which then have descended sufficiently to grip the slide. When the grippers 15, 16 have been opened the lever 18 continues to descend beyond the continuation 21 of the slanting steering surface 19 and slides downwardly around the same. Hereby the lever 18 moves laterally in the opposite direction from the direction hereinbefore described when the grippers were opened. By the movement of the lever 18 in the opposite direction the grippers are closed upon the slide 22 now in position to be raised and exhibited. As shown in Fig. 1 two small flat springs 23, 24 tend to normally keep the gripping fingers 15, 16 in a closed condition.

Two tooth racks 13 are connected with the horizontal bar 14 as shown in Fig. 2. However a single tooth rack 25 may be employed as shown in dotted lines in Fig. 1. This single tooth rack is connected to the bar 14 in its central portion.

Assuming now that the slide 22 has been gripped by the fingers 15, 16, then upon the further movement of the main cam 7 the lever 8 moves in a downward direction whereby the gripper mechanism is reversed and moves in an upward direction. The steering mechanism 19, 21, oscillates by means of a spring 26 which permits the lever 18 to pass upward without any obstruction by the steering mechanism. At the end of the movement the slide is brought into the field of vision 27 in line with the lenses 28. When descending again the steering plate with the slanting surfaces 19, 21 is forced back again into the first position by means of the lever 18 and the bent leaf 29 which overcomes the force of the spring 26. The operation of the described mechanism is repeated as described for releasing and gripping the slides in successive order.

A modified form of steering mechanism is illustrated in Fig. 5. A lever 30 is movably connected by means of pivot 31 and the spring 32 normally pushes the lever in an outward direction. At the bottom end the lever has a nose 33. The tooth rack 13 has secured thereto the grippers of which one 34 is stationary and one 35 is movable on a pivot 36. A nose 37 forming part of the movable gripper 35 is adapted to engage the nose 33 upon descending; said nose 33 has a slanting lower surface on which a slanting upper surface of the nose 37 may slide while ascending.

As herein stated the slide receptacle is moved step by step during the operation of the apparatus for the purpose of bringing the next slide into position to be raised and exhibited. This is effected by means of a small moving cam 38 mounted upon the main shaft 6. The cam 38 engages a lever 39 which transmits its motion to a lever 40 outside of the casing. The lever 40 moves a pawl 41 which engages the teeth of a rack 42 pushing the slide receptacle forward step by step, each tooth movement representing one step.

In order to prevent that any shades or pictures of the changing slides are shown on the screen mechanism is provided for temporarily closing the shutter. This mechanism is very simple and comprises a plate 43 mounted inside of the casing. The shutter is connected with a small lever 44 which carries a rod 45 having at the top a hook. The hooked rod is provided with a spring 46 at the bottom which tends to keep the rod down. If the hooked rod is down then the shutter is closed. A lever with a pin 47 which may be mounted on the shaft of the pinion 10 or if double racks are employed with gears behind the pin may be connected with one gear as shown in Fig. 2. Upon the rotation of the gear the pin 47 lifts the hook of the rod 45. The pin 47 is so mounted upon the gear that it is on its upper position when the gripper mechanism is in the upper position and then it lifts the hooked rod by engaging the top hook thereon, whereby the shutter is opened. If the apparatus starts to change the slides the gripper mechanism goes down and the pin 47 likewise goes down and is released from the hook of the rod 45 whereupon the spring 46 becomes effective and pulls the hooked rod 45 down whereby the shutter is closed.

As herein described the slide receptacle 20 for home and lecture use consists of a box in which the slides are stored in the desired order. The box rests on rails 48, 49 and is moved by the pawl and rack mechanism 41, 42 by means of the lever 40 which is actuated by the cam 38 on the main shaft. For advertising purposes the slide receptacle consists of a disk with slots as shown in Figs. 6 and 7. The disk 50 rotates on a stationary shaft 51 and may contain any desired number of slots 52 which are radially arranged as shown in Fig. 7. The disk mechanism is rotated, step by step by means of the pawl mechanism herein described in reference to Figs. 1 and 2. The lever 40 actuates a lever 53 upon a shaft 54 which carries a pawl 55. Upon the shaft 54 there is a lever 56 which passes around the shaft of the disk. The feed pawl 55 pushes the disk forward one step at the time and brings a slide 57 one step forward into the position to be seized by the grippers 15, 16 and raised into the field of vision after the former slide has been returned into its former position in the manner described relative to Figs. 1 and 2. Thus in this instance the change of the slides is effected in the same way as before, except to note that the slides are contained in a disk with slots instead of in a box. The projection apparatus for advertisements is driven by a motor which rotates continuously at a desired speed. The motor rotates the cam devices on the main shaft during each revolution and thereby the gripping mechanism so that each advertisement in the advertising device is exhibited a uniform period of time. This period of time depends on the speed of the motor and the construction of the speed reducing mechanism within the projection apparatus.

If a motor is employed to drive a projection apparatus for home and lecture use an electric device is used for the purpose of showing one picture on the screen for a short time and another one for a long time as required for the explanations to be given. The electric device is diagrammatically illustrated in Fig. 8 wherein 58 represents a line wire leading to a motor 59 from where a wire 60 connects with a spring 61 and a contact piece 62 at its lower end. A cam device 63 with a nose 64 is provided near the conductive spring 61 whereby contact may be made either with the contact piece 65 or the contact piece 66. From the contacts a wire 67 leads to a touch button 68 which is adapted to make contact with the wire 69 branching off to the contact piece 67 and forming further on the second line wire 70. After a slide has been changed the whole mechanism stops and the picture is exhibited until the mechanism is again operated by touching the push button. When the spring 61 rests against the contact 65 and the push button 68 is open then no current passes and the motor is at rest. When touching the button the circuit is closed as long as the button is touched and upon release of the button the motor stops. Meanwhile one slide has been automatically raised into the field of vision and is exhibited for any length of time until the button is touched again. When the spring 61 rests against the contact 66, that is when the nose of the cam device has moved away from the spring 61 then the motor runs without touching the button until the nose of the cam establishes connection between the spring 61 and the contact 65, leaving the contact 66 free.

I claim as my invention:

1. An automatic projecting apparatus for lantern slides comprising a slide carrier movable in a horizontal plane, means on said carrier for supporting a plurality of slides, a gripping device for successively raising the slides from the carrier into the field of vision and for replacing the slides in the carrier, means for opening and closing the gripping devices, means for raising and lowering the gripping devices, and means for shifting the slide carrier in timed relation to the gripping device.

2. An automatic projecting apparatus for lantern slides comprising a slide carrier movable in a horizontal plane, means on said carrier for supporting a plurality of slides, a gripping device for successively raising the slides from the carrier into the field of vision and for replacing the slides in the carrier, means for opening and closing the gripping devices, means for raising and lowering the gripping devices, and means for shifting the slide carrier after the exhibited slide has been replaced in the carrier to bring the next slide into position with relation to the grippers.

3. An automatic projecting apparatus for lantern slides comprising a slide carrier movable in a horizontal plane, means on said carrier for supporting a plurality of slides, a gripping device for successively raising the slides from the carrier into the field of vision and for replacing the slides in the carrier, means for opening and closing the gripping devices, means for raising and lowering the gripping device, and means for shifting the slide carrier step by step.

4. An automatic projecting apparatus for lantern slides comprising a slide carrier movable in a horizontal plane, means on said carrier for supporting a plurality of slides, a gripping device for successively raising the slides from the carrier into the field of vision and for replacing the slides in the carrier, spring means for closing the gripping devices, means for opening the gripping devices when replacing the slides, means for raising and lowering the gripping devices, and means for shifting the slide carrier in timed relation to the gripping devices.

5. An automatic projecting apparatus for lantern slides comprising a slide carrier movable in a horizontal plane, means on said carrier for supporting a plurality of slides, a gripping device for successively raising the slides from the carrier into the field of vision and for replacing the slides in the carrier, spring means for closing the gripping devices, shiftable means for opening the gripping devices when replacing the slides, means for raising and lowering the gripping devices, and means for shifting the slide carrier in timed relation to the gripping devices.

6. A projecting apparatus having a slide carrier, spaced slide supporting devices on the carrier, grippers for raising the slides one by one into the field of vision and for returning the slides to their supporting devices, means for raising and lowering the grippers, means for closing the grippers to grasp a slide when the grippers are in their lowered position, means for opening the grippers during the lowering thereof to permit the plate to drop by gravity to its support on the carrier, and means for shifting the carrier.

7. A projecting apparatus having a slide carrier, spaced slide supporting devices on the carrier, grippers for raising the slides one by one into the field of vision and for returning the slides to their supporting devices, means for closing the grippers to grasp a slide when the grippers are in their lowered position, means for opening the grippers during the lowering thereof to permit the plate to drop by gravity to its support on the carrier, and means for shifting the carrier one step after the grippers are opened and before they have reached their lowered position.

8. A projecting apparatus having a slide carrier, spaced slide supporting devices on the carrier, grippers for raising the slides one by one into the field of vision and for returning the slides to their supporting devices, means for raising and lowering the grippers, a shutter, shutter actuating mechanism connected to gripper raising and lowering means arranged to clear the shutter during the lowering thereof and to open the shutter during the raising thereof, means for closing the grippers to grasp a slide when the grippers are in their lowered position, means for opening the grippers during the lowering thereof to permit the plate to drop by gravity to its support on the carrier, and means for shifting the carrier.

9. An automatic projecting apparatus for lantern slides comprising a slide carrier movable in a horizontal plane, means on said carrier for supporting a plurality of slides, a gripping device for successively raising the slides from the carrier into the field of vision and for replacing the slides in the carrier, means for opening and closing the gripping device, means for raising and lowering the gripping devices, a shutter, automatic mechanism connected to the means for raising and lowering the gripping devices, said mechanism being arranged to open the shutter when a slide is in the field of vision and for closing the shutter when the slide is moved out of the field of vision, and means for shifting the slide carrier in timed relation to the gripping device.

10. A projecting device having a lens in the line of vision, a slide carrier movable in a horizontal plane below the plane of vision, means on the carrier for supporting a plurality of slides, slide raising and lowering mechanism including grippers, a shiftable device for opening the grippers on their downward movement, a spring for closing the grippers when in their lowered position, and means for shifting the carrier after the grippers are opened and before they are closed.

11. A projecting device having a lens in the line of vision, a slide carrier movable in a horizontal plane below the plane of vision, means on the carrier for supporting a plurality of slides, slide raising and lowering mechanism including grippers, a shiftable device for opening the grippers on their downward movement, a spring for closing the grippers when in their lowered position, a shutter, means for opening the shutter when a slide is in the line of vision and for closing said shutter when the slide is moved from the line of vision.

12. An automatic projection apparatus for lantern slides comprising means for applying power, speed reducing mechanism, a main cam driven thereby, a tooth rack device operated by the cam, and grippers on the rack device adapted to automatically change the slides.

13. An automatic projection apparatus for lantern slides comprising means for applying power, speed reducing mechanism, a main cam driven thereby, a tooth rack device operated by the cam, a slide receptacle, means to move the receptacle step by step, and grippers on the rack device adapted to automatically change the slides.

14. An automatic projection apparatus for lantern slides comprising means for applying power, speed reducing mechanism, a main cam driven thereby, a tooth rack device operated by the cam, a slide receptacle, means to move the receptacle step by step, slide grippers on the rack device, and gripper steering means adapted to close and open the grippers and thereby automatically change the slides.

15. An automatic projection apparatus for lantern slides comprising means for applying power, speed reducing mechanism, a main cam driven thereby, a tooth rack device operated by the cam, a slide receptacle, a small cam for moving the receptacle step by step, slide grippers on the rack device, and gripper steering means adapted to close and open the grippers and thereby automatically change the slides.

16. An automatic projecting device for lantern slides having a line of vision into which the slides are moved one by one, a slide carrier movable in a plane below the line of vision, a plurality of slide holders on the carrier, slide raising and lowering devices for raising the slides from the carrier into the line of vision from the carrier and then depositing them on the carrier, a main shaft, a cam on said shaft for actuating the raising and lowering mechanism, power means, reducing gearing between the power means and said shaft, carrier actuating means, and a cam on the main shaft for actuating the carrier in timed relation to the slide raising and lowering devices.

17. An automatic projection apparatus for lantern slides comprising a main shaft, speed reducing means in connection therewith, a main cam on the shaft, a lever actuated by the cam, a tooth rack moved by the lever, a pinion with shaft engaged by the tooth rack, a large gear on the pinion shaft, a toothed gripper carrier moved by the gear, and grippers at the bottom end of the gripper carrier, the said gripper carrier moving up and down to change the slides in accordance to the direction in which the large gear revolves.

18. An automatic projection apparatus for lantern slides comprising a gripper carrier, means for moving the said carrier up and down, a horizontal gripper bar on the carrier, two grippers mounted one at each end of the bar, a spring on each gripper to keep it normally closed, a curved lever on one gripper with top nose, a gripper steering device with slanting surfaces below upon which the nose of the bent lever slides whereby the grippers are opened and closed again when the nose of the bent lever passes beyond the slanting surface of the steering device.

19. An automatic projecting device for lantern slides having a line of vision into which the slides are moved one by one, a slide carrier movable in a plane below the line of vision, a plurality of slide holders on the carrier, slide raising and lowering devices including a rack and pinion for raising the slides from the carrier into the line of vision from the carrier and then depositing them on the carrier, a main shaft, a cam on said shaft for actuating the raising and lowering mechanism, power means, reducing gearing between the power means and said shaft, carrier actuating means, and a cam on the main shaft for actuating the carrier in timed relation to the slide raising and lowering devices.

20. An automatic projection apparatus for lantern slides comprising a circular slide receptacle moving in a horizontal plane, finger gripper mechanism operated and working above the receptacle, means for raising one slide automatically by said finger gripper mechanism in a vertical plane, into the field of vision, and returning it into the circular receptacle, means for moving the circular receptacle step by step, and means for allowing the receptacle to be removed when its slides have been shown, and inserting another circular receptacle with different slides.

Signed at Philadelphia, Pa., this 19 day of March, 1917.

PAUL DIETZ.

Witnesses:
  DOROTHY YOUNG,
  OSCAR L. GOOSEL.

It is hereby certified that in Letters Patent No. 1,371,871, granted March 15, 1921, upon the application of Paul Dietz, of Philadelphia, Pennsylvania, for an improvement in "Automatic Projection Apparatus for Lantern-Slides," an error appears in the printed specification requiring correction as follows: Page 1, line 3, for the words "Empire of Germany" read *United States;* and that the said Letters Patent should be read with this correction therein that the same may conform to the record of the case in the Patent Office.

Signed and sealed this 12th day of April, A. D., 1921.

[SEAL.]
T. E. ROBERTSON,
*Commissioner of Patents.*

Cl. 88—27.